US010434598B2

(12) United States Patent
Baudimont et al.

(10) Patent No.: US 10,434,598 B2
(45) Date of Patent: Oct. 8, 2019

(54) METHOD FOR MONITORING THE ENERGY DENSITY OF A LASER BEAM BY IMAGE ANALYSIS AND CORRESPONDING DEVICE

(71) Applicant: SAFRAN AIRCRAFT ENGINES, Paris (FR)

(72) Inventors: Cyrille Baudimont, Moissy-Cramayel (FR); Julie Fouquet, Moissy-Cramayel (FR); Didier Monnet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 43 days.

(21) Appl. No.: 15/022,850

(22) PCT Filed: Sep. 17, 2014

(86) PCT No.: PCT/FR2014/052312
§ 371 (c)(1),
(2) Date: Mar. 17, 2016

(87) PCT Pub. No.: WO2015/040327
PCT Pub. Date: Mar. 26, 2015

(65) Prior Publication Data

US 2016/0228987 A1 Aug. 11, 2016

(30) Foreign Application Priority Data

Sep. 18, 2013 (FR) .................................... 13 58963

(51) Int. Cl.
*B23K 26/062* (2014.01)
*B33Y 50/02* (2015.01)
(Continued)

(52) U.S. Cl.
CPC .......... *B23K 26/0626* (2013.01); *B22F 3/008* (2013.01); *B22F 3/1055* (2013.01);
(Continued)

(58) Field of Classification Search
CPC .............. B23K 26/0626; B23K 26/342; B23K 26/032; B23K 26/705; B33Y 50/02
See application file for complete search history.

(56) References Cited

U.S. PATENT DOCUMENTS 4,937,422 A * 6/1990 Nagamine ............ B23K 26/705 219/121.61
2004/0200816 A1* 10/2004 Chung ............... G05D 23/1919 219/121.83
(Continued)

FOREIGN PATENT DOCUMENTS

DE 103 20 085 A1 2/2004
DE 10 2010 027 910 A1 10/2011
(Continued)

OTHER PUBLICATIONS

Machine translation of Japan Patent document No. 2008-264,789, May 2018.*
(Continued)

*Primary Examiner* — Geoffrey S Evans
(74) *Attorney, Agent, or Firm* — Oblon, McClelland, Maier & Neustadt, L.L.P.

(57) ABSTRACT

A method for monitoring the energy density of a laser beam using parameters of the laser beam including regularly applying the laser beam to a reference substrate and measuring, with each application, the resulting light intensity; identifying a change in the light intensity on the reference substrate between at least two measurements; and, when the change in the light intensity is higher than a predetermined threshold, determining the unstable parameter or parameters of the energy density of the laser beam.

15 Claims, 3 Drawing Sheets

Figure 1:
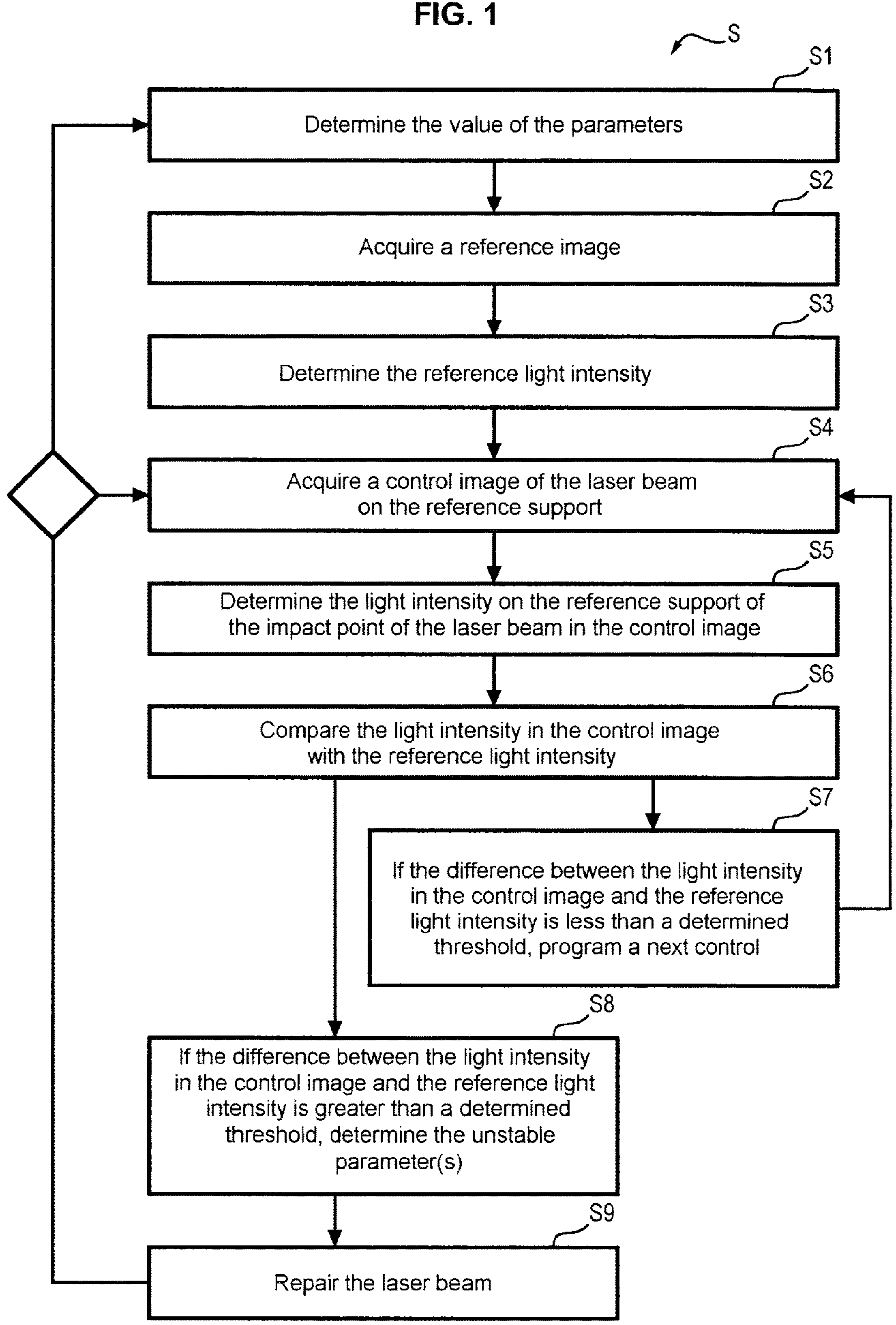

S
S1 Determine the value of the parameters
S2 Acquire a reference image
S3 Determine the reference light intensity
S4 Acquire a control image of the laser beam on the reference support
S5 Determine the light intensity on the reference support of the impact point of the laser beam in the control image
S6 Compare the light intensity in the control image with the reference light intensity
S7 If the difference between the light intensity in the control image and the reference light intensity is less than a determined threshold, program a next control
S8 If the difference between the light intensity in the control image and the reference light intensity is greater than a determined threshold, determine the unstable parameter(s)
S9 Repair the laser beam

(51) Int. Cl.

| | |
|---|---|
| ***B23K 26/06*** | (2014.01) |
| ***B22F 3/105*** | (2006.01) |
| ***B22F 5/00*** | (2006.01) |
| ***B22F 5/04*** | (2006.01) |
| ***B23K 26/342*** | (2014.01) |
| ***B22F 3/00*** | (2006.01) |
| ***B23K 26/00*** | (2014.01) |
| ***B29C 64/386*** | (2017.01) |
| ***B23K 26/70*** | (2014.01) |
| ***B23K 26/03*** | (2006.01) |
| *B23K 103/10* | (2006.01) |
| *B23K 103/16* | (2006.01) |
| *B33Y 10/00* | (2015.01) |
| *B29C 64/153* | (2017.01) |
| *B23K 101/34* | (2006.01) |

(52) U.S. Cl.

CPC ................ *B22F 5/009* (2013.01); *B22F 5/04* (2013.01); *B23K 26/0006* (2013.01); *B23K 26/032* (2013.01); *B23K 26/342* (2015.10); *B23K 26/705* (2015.10); *B29C 64/386* (2017.08); *B33Y 50/02* (2014.12); *B22F 2003/1056* (2013.01); *B22F 2999/00* (2013.01); *B23K 2101/35* (2018.08); *B23K 2103/10* (2018.08); *B23K 2103/166* (2018.08); *B29C 64/153* (2017.08); *B33Y 10/00* (2014.12); *Y02P 10/295* (2015.11)

(56) References Cited

U.S. PATENT DOCUMENTS

| | | | | | |
|---|---|---|---|---|---|
| 2005/0141580 | A1* | 6/2005 | Partlo | B23K 26/0738 | 372/55 |
| 2006/0072111 | A1* | 4/2006 | Budd | G01N 15/042 | 356/427 |
| 2006/0109461 | A1* | 5/2006 | Ishibashi | G01N 21/6456 | 356/318 |
| 2008/0078751 | A1* | 4/2008 | Abrott | B23K 26/03 | 219/121.69 |
| 2008/0156778 | A1* | 7/2008 | Lin | B23K 26/03 | 219/121.68 |
| 2008/0188012 | A1* | 8/2008 | Yazaki | B23K 26/032 | 438/7 |
| 2009/0277803 | A1* | 11/2009 | Wei | B23H 3/00 | 205/665 |
| 2010/0051793 | A1* | 3/2010 | Riedel | G01B 11/22 | 250/252.1 |
| 2010/0140236 | A1* | 6/2010 | Cai | B23K 26/03 | 219/121.72 |
| 2014/0333011 | A1* | 11/2014 | Javidan | B29C 67/0055 | 264/401 |
| 2014/0339208 | A1* | 11/2014 | Huang | B23K 26/0853 | 219/121.81 |

FOREIGN PATENT DOCUMENTS

| | | | | |
|---|---|---|---|---|
| EP | 1 466 718 | A2 | | 10/2004 |
| EP | 1 466 718 | A3 | | 3/2009 |
| JP | 2007054881 | A | * | 3/2007 |
| JP | 2008-264789 | A | * | 11/2008 |

OTHER PUBLICATIONS

Machine translation of Japan Patent document No. 2007-054,881-A, Feb. 2019.*

International Search Report dated Dec. 3, 2014 in PCT/FR2014/052312 filed Sep. 17, 2014 (with English translation of categories of cited documents).

French Search Report dated Jun. 17, 2014 in Patent Application No. FR 1358963 (with English translation of categories of cited documents).

International Search Report dated Dec. 3, 2014, in PCT/FR2014/052312 filed Sep. 17, 2014.

* cited by examiner

METHOD FOR MONITORING THE ENERGY DENSITY OF A LASER BEAM BY IMAGE ANALYSIS AND CORRESPONDING DEVICE

FIELD OF THE INVENTION

The invention relates to the field of manufacturing parts by Selective Laser Melting (SLM), i.e. a technique for additive manufacturing capable of producing metal parts by means of high power lasers gradually and locally melting, i.e. in a selective way, a metal powder in a controlled atmosphere.

TECHNOLOGICAL BACKGROUND

Selective laser melting is a method allowing the manufacturing of a molded body, for example a prototype of a product or of a component, according to three dimensional CAD data of a model of a molded part by deposition of layers of a material as a powder. Several layers of the powder are successively deposited on each other, so that each powder layer is heated to a temperature determined by a focused laser beam of high power (from 200 W to a few kW) applied on a given area of the powder layer corresponding to a determined cross-section area of the model of the molded body, before depositing the next layer. The laser beam is guided above each powder layer in accordance with the CAD data of the determined transverse surface of the model, so that each powder layer is attached to the underlying layer. By repeating the provision of powder and of its melting by the laser gives the possibility of gradually thickening the part and obtaining the desired shapes.

An example of such a laser selective melting method has notably been described in documents FR 2 970 887 and U.S. Pat. No. 6,215,093.

In order to obtain a part with metallurgical quality and a dimension observing the tolerances notably imposed in the field of turbine engines, it is necessary that the energy density of the laser beam remains constant in the manufacturing plane (the powder bed) and during the period of exposure to the laser.

The energy density depends on three parameters: the power, the velocity and the size of the laser beam.

Presently, the monitoring of the energy density of the laser beam is obtained indirectly by independently measuring these three parameters. Nevertheless, this monitoring has the drawback of requiring individual measurements which are successively carried out by different apparatuses. In addition to being long and difficult to apply in industry, this monitoring of the energy density of the laser beam is not robust, the measurements undergoing the risk of being distorted by drifts of the apparatuses used. These apparatuses are further specific and often require training and particular skills in order to be used, are further expensive, fragile and long to apply and have to be periodically checked. Finally, the whole of the manufacturing space is not accessible for allowing these measurements.

In document EP 1 466 718, a method for controlling the temperature on a target area (such as a powder bed) has been proposed, from an image of the target area acquired by means of a thermal vision system, such as an infrared camera. The thereby determined temperature is then compared with a desired temperature, which gives the possibility of improving the control of the overall temperature of the powder bed. However, this method by no means allows determination of whether the energy density of the laser beam is stable, or whether one of the parameters on which it depends is unstable. Indeed, the question is only of adapting the temperature of the laser beam so as to avoid temperature differences at the powder bed which would be detrimental to the quality of the part which one seeks to manufacture.

Document DE 103 20 085, as for it, describes a method for manufacturing a part by selective melting, during which the light density is adapted so as to improve the final density of the part. Adaptation of the light density is in particular adapted by means of a CCD camera, which measures the thickness of the powder to be melted, and a pyrometer, which determines its temperature. This document therefore does not deal with the control of the stability of the energy density of a laser beam.

Finally, document DE 10 2010 027910 deals with a method for manufacturing a part by laser melting, during which the power of the laser is regularly measured in order to detect possible deviations with respect to expected power values. This document therefore only proposes measurement of one of the parameters playing a role on the energy density of the laser bream, the other parameters not being determined.

None of these documents therefore proposes a reliable and fast means for detecting a drift of the parameters of the energy density in a simple way and for moderate cost.

SUMMARY OF THE INVENTION

A goal of the invention is therefore to propose a method for controlling the energy density of a laser beam and an associated control device surmounting the drawbacks of the state of the art, which allows rapid detection of a drift of a portion of the parameters (power, velocity, size of the laser beam) for a moderate cost as compared with the prior art and which may be industrialized, and this in the whole manufacturing space.

For this, the invention proposes a method for controlling the energy density of a laser beam from at least two parameters of the laser beam, the method comprising the following steps:

- regularly applying the laser beam on a reference support and measuring, at each use, a light intensity obtained on this reference support,
- identifying a change in the light intensity on the reference support between at least two measurements, and
- when the variation of the light intensity is greater than a given threshold, determining the unstable parameter(s) of the energy density of the laser beam.

Certain preferred but non-limiting features of the control method described above are the following:

- the energy density of the laser beam is controlled from three parameters notably comprising the power, the velocity and the size of the laser beam,
- the step for applying and regularly measuring the light intensity on the reference support comprises the following sub-steps:

(i) applying the laser beam on a reference support and acquiring an image of the laser beam on said reference support, in order to obtain a reference image, (ii) determining the light intensity at the point of application of the laser beam in the reference image, and (iii) regularly applying the laser beam on the reference support and acquiring an image of the laser beam on said reference support, in order to obtain a control image, and to determine the light intensity on the reference support at the point of application of the laser beam in the control image, and the step for identifying a variation in the light intensity comprises the following sub-steps:

(iv) comparing the light intensity of the thereby obtained control image with the light intensity of the reference image, and (v) inferring therefrom the variation in the energy density of the laser beam,

- the light intensity is determined by measuring the gray levels of the reference image and of the control image,
- the grey levels of the reference image and of the control image are measured in several points, so that the light intensity is determined by averaging the intensity profile in each point of each image,
- the method further comprises an initial step, before applying the laser beam on a reference surface in order to acquire the reference image, during which an initial value of the parameters is determined, and, when the variation in the light intensity is greater than a given threshold, the method further comprises the sub-steps during which the value of the parameters of the laser beam is determined and it is compared with the initial value of said parameters in order to identify the unstable parameter(s), and the laser is modified in order to re-stabilize said unstable parameter(s),
- the steps (i) to (iii) are re-iterated with the laser beam once it is modified, in order to define a new reference image, and
- the initial step is also re-iterated.

The invention also proposes a device for controlling the energy density of a laser beam from at least two parameters of the laser beam, said parameters comprising a power, a velocity and/or a size of the laser beam, the device being able to control the energy density of the laser beam as indicated above, and comprising:

- an image acquisition system, configured for acquiring images of the laser beam on the reference support, and
- an image processing system, adapted for comparing the light intensity of the different images acquired by the image acquisition system and identifying a variation in the light intensity on the reference support between at least two measurements, and
- data processing means, adapted for determining, from the variation of the light intensity, whether at least one of the parameters of the laser beam is unstable.

Certain preferred but non-limiting features of the control device are the following:

- the reference support comprises a homogenous coating,
- the reference support comprises a plate in an aluminium alloy,
- the plate in an aluminium alloy is anodized and comprises an anodization layer,
- the anodization layer is of a black color,
- the anodization layer has a thickness comprised between 0.5% and 3% of a thickness of the plate in aluminium alloy, preferably of the order of 1%,
- the thickness of the plate in aluminium alloy is of the order of 1 mm and the thickness of the anodization layer is of the order of 0.01 mm.

SHORT DESCRIPTION OF THE DRAWINGS

Figure 2:
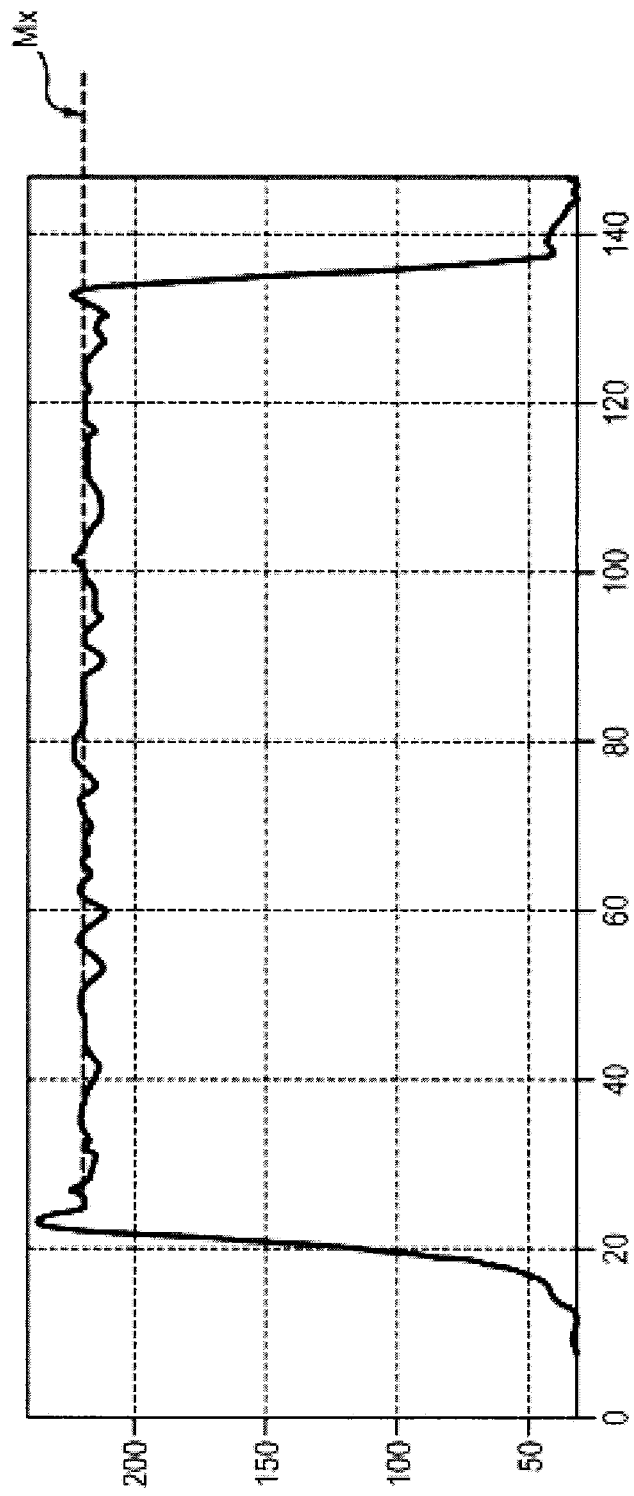
Figure 3:
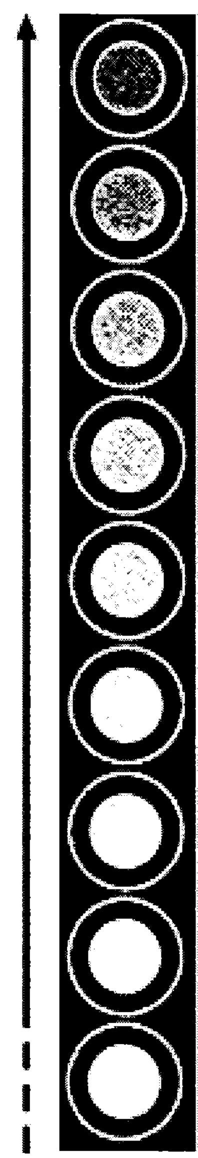
Figure 4:
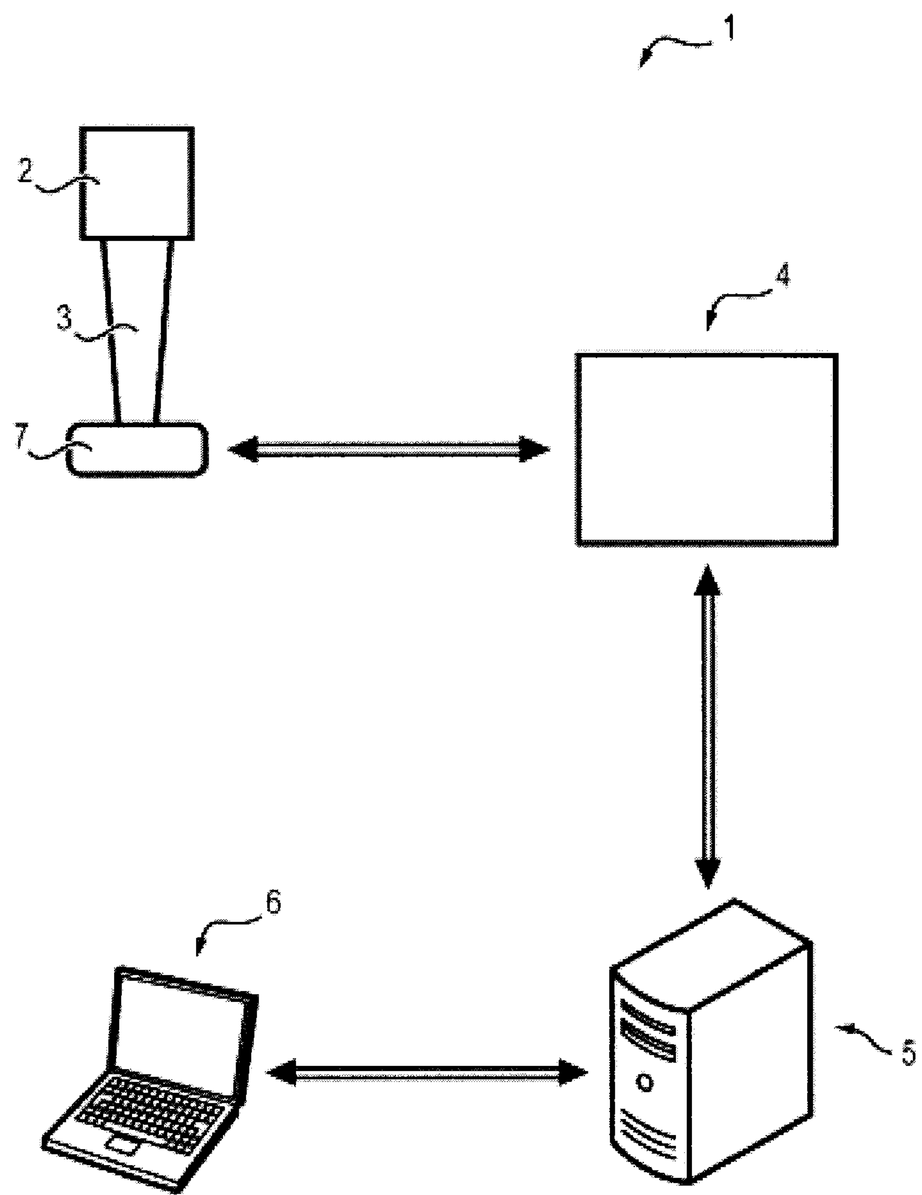

Other features, objects and advantages of the present invention will become better apparent upon reading the detailed description which follows, and with reference to the appended drawings given as non-limiting examples and wherein:

FIG. 1 is a flowchart representing various steps of an exemplary embodiment of the method for controlling the energy density of a laser beam according to the invention, FIG. 2 is a graph which illustrates an example of an intensity profile of an image, i.e. the grey levels versus distance (in pixels), FIG. 3 illustrates an example of degradation of the energy density of a laser beam, and FIG. 4 schematically illustrates an example of a device for controlling the energy density of a laser beam according to the invention.

DETAILED DESCRIPTION OF AN EMBODIMENT

In order to control the constancy of the energy density of a laser beam 3 in the manufacturing plane and during the period of exposure of the power to the laser, the invention proposes a method S for controlling the energy density from at least two parameters of the laser beam 3 comprising the following steps:

- regularly applying the laser beam 3 on a reference support 7 and measuring S4, at each application, the light intensity obtained on this reference support.
- identifying S6, S7, S8 a variation of the light intensity on the reference support 7 between at least two measurements, and
- when the variation of the light intensity is greater than a given threshold, determining the unstable parameter(s) of the energy density of the laser beam 3 S8.

The invention is based on the fact that the light intensity obtained by applying a laser beam 3 on a given support is representative of the energy density of this laser 2. It is thus possible to limit the number of measured parameters to the light intensity obtained on the reference support 7 exclusively, and then to infer therefrom variations in the energy density of the laser 3, and therefore the instability of at least one of its parameters, so that the number of measurements and the difficulty of measuring them is strongly reduced as compared with the prior art. The method S is therefore faster and easier to apply.

Moreover, the method S may be applied by means of a device 1 for controlling the energy density comprising common apparatuses, requiring no or little training or particular skills, such as:

- an image acquisition system 4, configured for acquiring images of the laser beam 3 on the reference support 7, and
- an image processing system 5, adapted for comparing the light intensity of the different images acquired by the image acquisition system 4 and identifying a variation in the light intensity on the reference support 7 between at least two measurements, and
- data processing means 6, adapted for determining, from the variation in the light intensity, whether at least one of the parameters of the laser beam 3 is unstable.

For example, the image acquisition system 4 may be a scanner, a camera or further a video camera, while the image processing system 5 may comprise an image processing software package and the data processing means 6 may comprise a central unit, optionally connected to interface means adapted for displaying the results of the method S.

Moreover, the parameters of the laser beam 3 from which it is possible to control the energy density of the laser beam 3 are selected from the power, the velocity and the size of the laser beam 3. Preferably, the three parameters are examined during the control method S.

The light intensities are compared with a reference light intensity, which corresponds to the light intensity on the reference support 7 representative of the energy density of the laser beam 3 when its parameters are stable, measured under identical or similar conditions.

The reference light intensity may be measured as follows.

During a first step S1, the parameters (power, velocity and/or size of the light beam) are measured in a conventional way with specific apparatuses. If the obtained measurements are not compliant, the laser 2 is repaired, and the measurements are again carried out in order to check the consistency of the parameters after repair.

The obtained measurements are then recorded, for example in the data processing means 6.

The reference light intensity is then determined.

For this, the laser beam 3 is applied on the reference support 7 and the image of the light beam on the reference support 7 is acquired by the image acquisition system 4 (step S2), for example a scanner, a reference image is then obtained.

The reference image may then be converted into grey levels by the image processing system 5. The image processing system 5 may for example measure the grey levels of the surface exposed to the laser beam 3 in this reference image in several points, notably by producing the intensity profile in each point (FIG. 2). Finally, the reference light intensity may be determined by producing the average Mx of the grey level over the whole of the points of the exposed surface (step S3).

The data processing means 6 may then record the reference light intensity, in association with the measurement of the parameters of the reference light beam.

The control of the energy density of the laser beam 3 may then be carried out regularly, in a rapid way, easily and not very costly, by regularly applying the laser beam 3 on the reference support 7, and by monitoring the time-dependent change in the light intensity at the impact point of the laser beam 3 on this reference support 7, measured and determined under the same conditions as the reference light intensity. Indeed it is sufficient to regularly repeat for example periodically the measurement of the light intensity.

For this, after a determined period, the light beam of the laser is applied on the same reference support 7 or at the very least on an identical or similar reference support 7. Preferably, the laser beam is applied under the same conditions (height, position and tilt relatively to the reference support 7, etc) than for producing the reference image.

The image of the light beam on the reference support 7 is acquired by the image acquisition system 4, for example the scanner (step S4), a control image is then obtained.

The control image is then processed in a similar way to the reference image, in order to obtain easily comparable data. Thus, the control image may be converted into grey levels by the image processing system 5, which may notably measure the grey levels of the surface exposed to the laser beam 3 in this image in several points by producing the intensity profile in each point. Finally, the light intensity of the control image may be determined by averaging Mx the grey level over the whole of the points of the exposed surface (step S5).

The light intensity of the control image is then compared with the reference light intensity, which was determined beforehand for this laser beam 3 and recorded in the data processing means 6 (step S6).

When the difference between the light intensity of the control image and the reference light intensity is less than a determined threshold, the energy density is considered as stable. The laser 2 is therefore not modified, and a next control may be programmed according to the periodicity selected for the control of the energy density of the laser beam 3 (step S7).

The determined threshold may for example be set experimentally by simulating a degradation of the energy density of the light beam down to the acceptability limit, and by measuring the obtained light intensity for this energy density of the light beam on the reference support 7.

During the next control, the steps S4 to S6 are therefore repeated with the values of the reference light intensity and of the parameters recorded in the data processing means 6.

On the other hand, when the difference between the light intensity of the control image and the reference light intensity attains or exceeds the determined threshold, the energy density is degraded (FIG. 3). In this case, one then searches for the parameter of the energy density which is unstable, by measuring each of the parameters in a conventional way with the specific apparatuses (step S8).

Once the unstable parameter(s) have been determined, the laser 2 may be repaired (S9).

A new measurement of the reference light intensity may then be conducted and recorded with the new values of the parameters, according to steps S1 to S3 described above, and then the method S may be reiterated by continuing the monitoring of the energy density of the laser beam 3. Of course it will be understood that this monitoring is carried out by comparing the light intensities of the control images with the new reference intensity, in order to take into account modifications of the laser 2.

Alternatively, it is also possible to retain the reference light intensity without again making new measurements, in which case the monitoring is carried out by comparing the light intensities of the control images with the reference light intensity determined initially.

The reference support 7 preferably comprises a surface having a homogeneous coating, sensitive to the received energy. This may notably be a plate in anodized aluminium alloy, the anodization layer may notably be of a black color. Such an anodized aluminium alloy plate 7 thus allows improvement in the quality of the monitoring by means of its homogenous coating. Indeed, when the laser is applied on a plate 7 in an aluminium alloy comprising an anodization layer, the latter locally melts the anodization layer. When the energy density of the laser beam is sufficient, metal brilliance is then obtained and therefore maximum light intensity upon acquiring the images (S2, S4). On the other hand, when the energy density of the beam decreases, a grey hue is obtained.

In an embodiment, the thickness of the plate 7 in an aluminium alloy is comprised between about 0.5 mm and about 2 mm, typically of the order of 1 mm, and is covered with an anodization layer having a defined anodization thickness. For example, the thickness of the anodization layer may be comprised between 0.5% and 3% of the thickness of the aluminium plate, preferably of the order of 1% to 2%, typically 1%. If necessary, the value of the anodization thickness as well as its quality may be subject to monitoring overtime in order to guarantee the robustness of the reference support 7.

Of course other reference supports 7 may be used, in so far that they allow detection of the light intensity variations with sufficient accuracy.

Moreover, the frequency according to which control of the energy density is carried out may be constant, or vary depending on the difference between the light intensity of the control image and the reference light intensity.

The invention claimed is:

1. A method for controlling the energy density of a laser beam from at least two parameters of the laser beam, the method comprising:

repeatedly applying the laser beam on a reference support and measuring, at each application of the laser beam on the reference support, the light intensity obtained on the reference support, identifying a variation in the light intensity on the reference support between at least two measurements, and when the variation in the light intensity is greater than a threshold, determining at least one unstable parameter of the energy density of the laser beam.

2. The control method according to claim 1, wherein the energy density of the laser beam is controlled from three parameters comprising the power, the scanning velocity and the size of the laser beam.

3. The control method according to claim 1, wherein the repeatedly applying the laser beam and measuring the light intensity on the reference support comprises:

(i) applying the laser beam on the reference support and acquiring an image of the laser beam on said reference support, in order to obtain a reference image, (ii) determining the light intensity of the laser beam in the reference image, and (iii) repeatedly applying the laser beam on the reference support and acquiring, at each application, an image of the laser beam on said reference support, in order to obtain a control image, and determine the light intensity on the reference support of the laser beam in the control image, and the identifying the variation in the light intensity comprises:

(iv) comparing the light intensity of an obtained control image with the light intensity of the reference image, and (v) inferring therefrom the variation in the energy density of the laser beam.

4. The control method according to claim 3, wherein the light intensity is determined by measuring the greyscale of the reference image and of the control image.

5. The control method according to claim 4, wherein the greyscale of the reference image and of the control image are measured in several points, so that the light intensity of the reference image and of the control image is determined by averaging the greyscale in each point of the reference image and of the control image, respectively.

6. The control method according to claim 3, further comprising, before applying the laser beam on the reference surface in order to acquire the reference image, determining an initial value of each of the parameters, and further comprising, when the variation in the light intensity is greater than the threshold, determining values of the parameters of the laser beam and comparing the determined values to the initial values of said parameters in order to identify the at least one unstable parameter, and modifying a laser generating the laser beam in order to re-stabilize said at least one unstable parameter.

7. The control method according to claim 6, wherein the steps (i) to (iii) are repeated after the laser is modified, in order to define a new reference image.

8. The control method according to claim 7, wherein the determining an initial value of each of the parameters is repeated after the laser is modified.

9. A device for controlling the energy density of a laser beam from at least two parameters of the laser beam, said parameters comprising a power, a scanning velocity and a size of the laser beam, the device controlling the energy density of the laser beam comprising:

an image acquisition system, configured to acquire images of the laser beam each time the laser beam is applied on a reference support, and a first computer, configured to measure, each time the laser beam is applied on the reference support, the light intensity of the images acquired by the image acquisition system and to identify a variation in the light intensity on the reference support between at least two measurements, and a second computer configured to determine, when the variation in the light intensity is greater than a threshold, at least one unstable parameter of the parameters of the laser beam.

10. The control device according to claim 9, wherein the reference support comprises a homogenous coating.

11. The control device according to claim 9, wherein the reference support comprises a plate in aluminum alloy.

12. The control device according to claim 11, wherein the plate in aluminum alloy is anodized and comprises an anodization layer.

13. The control device according to claim 12, wherein the anodization layer is of a black color.

14. The control device according to claim 12, wherein the anodization layer has a thickness comprised between 0.5% and 3% of a thickness of the plate in aluminum alloy.

15. The control device according to claim 14, wherein the thickness of the plate in aluminum alloy is of the order of 1 mm and the thickness of the anodization layer is of the order of 0.01 mm.

* * * * *